United States Patent
Rubenstein (10) Patent No.: US 11,470,839 B2
(45) Date of Patent: Oct. 18, 2022

(54) GAME CALL AND METHOD OF MANUFACTURE

(71) Applicant: Iowa Hunting Products, LLC, Newton, IA (US)

(72) Inventor: Brian Rubenstein, Detroit Lakes, MN (US)

(73) Assignee: IOWA HUNTING PRODUCTS, LLC, Newton, IA (US)

( * ) Notice: Subject to any disclaimer, the term of this patent is extended or adjusted under 35 U.S.C. 154(b) by 2 days.

(21) Appl. No.: 17/074,781

(22) Filed: Oct. 20, 2020

(65) Prior Publication Data

US 2021/0127662 A1    May 6, 2021

Related U.S. Application Data

(60) Provisional application No. 62/928,090, filed on Oct. 30, 2019.

(51) Int. Cl.
*A01M 31/00* (2006.01)
*B29C 43/00* (2006.01)
*A61G 17/007* (2006.01)

(52) U.S. Cl.
CPC ......... *A01M 31/004* (2013.01); *B29C 43/003* (2013.01); *A61G 17/0136* (2017.05)

(58) Field of Classification Search
CPC .................................................. A01M 31/004
USPC ....... 446/202, 203, 204, 205, 206, 207, 208, 446/209
See application file for complete search history.

(56) References Cited

U.S. PATENT DOCUMENTS

| | | | | | |
|---|---|---|---|---|---|
| 2,296,785 | A | * | 9/1942 | Hoeflich | G10D 9/08 446/209 |
| 2,296,786 | A | * | 9/1942 | Hoeflich | G10D 7/12 446/209 |
| 2,607,162 | A | * | 8/1952 | Hoeflich | G10D 9/02 446/209 |
| 4,883,844 | A | * | 11/1989 | Hefner, Jr. | C08G 59/26 525/472 |
| 6,382,111 | B1 | * | 5/2002 | Hojaji | B09B 3/29 110/341 |
| 6,615,463 | B1 | * | 9/2003 | Hojaji | C04B 33/135 110/341 |
| 7,384,323 | B2 | * | 6/2008 | Sceery | A01M 31/004 446/202 |

(Continued)

*Primary Examiner* — Joseph B Baldori
(74) *Attorney, Agent, or Firm* — Christopher A. Proskey; BrownWinick Law Firm (57) ABSTRACT

In one or more arrangements, a method is provided for manufacturing a game call that incorporates ashes of cremated remains of a pet or loved one. The provided method incorporates the ashes into a polymer mixture used to form one or more components of the game call. In this manner, the resulting game call may serve as a memorial keepsake of the pet or loved one. The ashes are mixed with a polymer and poured into a mold. The mold is shaped for formation of at least one component of the game call. Once hardened, the polymer and remains mixture is removed from the mold and set to cure. After curing, a call profile is cut into the component. The component may be processed, for example, by sanding, wet sanding, finishing, painting, and/or polishing. The component is assembled with other components of the game call to form the game call.

19 Claims, 10 Drawing Sheets

(56) References Cited

U.S. PATENT DOCUMENTS

| | | | | |
|---|---|---|---|---|
| 7,918,709 | B1* | 4/2011 | Primos | A01M 31/004 |
| | | | | 446/202 |
| 8,672,725 | B1* | 3/2014 | Betts | A01M 31/004 |
| | | | | 446/397 |
| 9,168,573 | B2* | 10/2015 | Hojaji | B09B 5/00 |
| 9,700,923 | B2* | 7/2017 | Camps | B44C 5/00 |
| 9,756,775 | B2* | 9/2017 | Bibaud | A01C 1/046 |
| 9,763,846 | B2* | 9/2017 | Bisson | A61G 17/08 |
| 10,080,361 | B2* | 9/2018 | Thomas | A01M 31/004 |
| 2006/0240739 | A1* | 10/2006 | Kennedy | G10K 5/00 |
| | | | | 446/219 |
| 2009/0077779 | A1* | 3/2009 | Zimmerman | C04B 28/04 |
| | | | | 110/341 |
| 2010/0143653 | A1* | 6/2010 | Cranham | B09B 3/20 |
| | | | | 428/156 |
| 2014/0116296 | A1* | 5/2014 | Williams | B28B 17/0081 |
| | | | | 264/333 |
| 2015/0320158 | A1* | 11/2015 | Duffy, Jr. | A44C 17/00 |
| | | | | 419/10 |
| 2017/0181422 | A1* | 6/2017 | Reagan | A01M 31/004 |
| 2017/0254108 | A1* | 9/2017 | Armstrong | C04B 26/02 |
| 2017/0282196 | A1* | 10/2017 | Boomer | B05D 3/04 |

* cited by examiner

PRIOR ART

PRIOR ART

GAME CALL AND METHOD OF MANUFACTURE

CROSS-REFERENCE TO RELATED APPLICATIONS

The present application claims priority to U.S. Provisional Application No. 62/928,090, titled "An acrylic casted duck/goose call containing ashes from a deceased dog/pet. 'Man's Best Friend' game call" and filed Oct. 30, 2019, the entirety of which is hereby incorporated by reference herein in its entirety, including any figures, tables, or drawings or other information.

OVERVIEW

Figure 1:
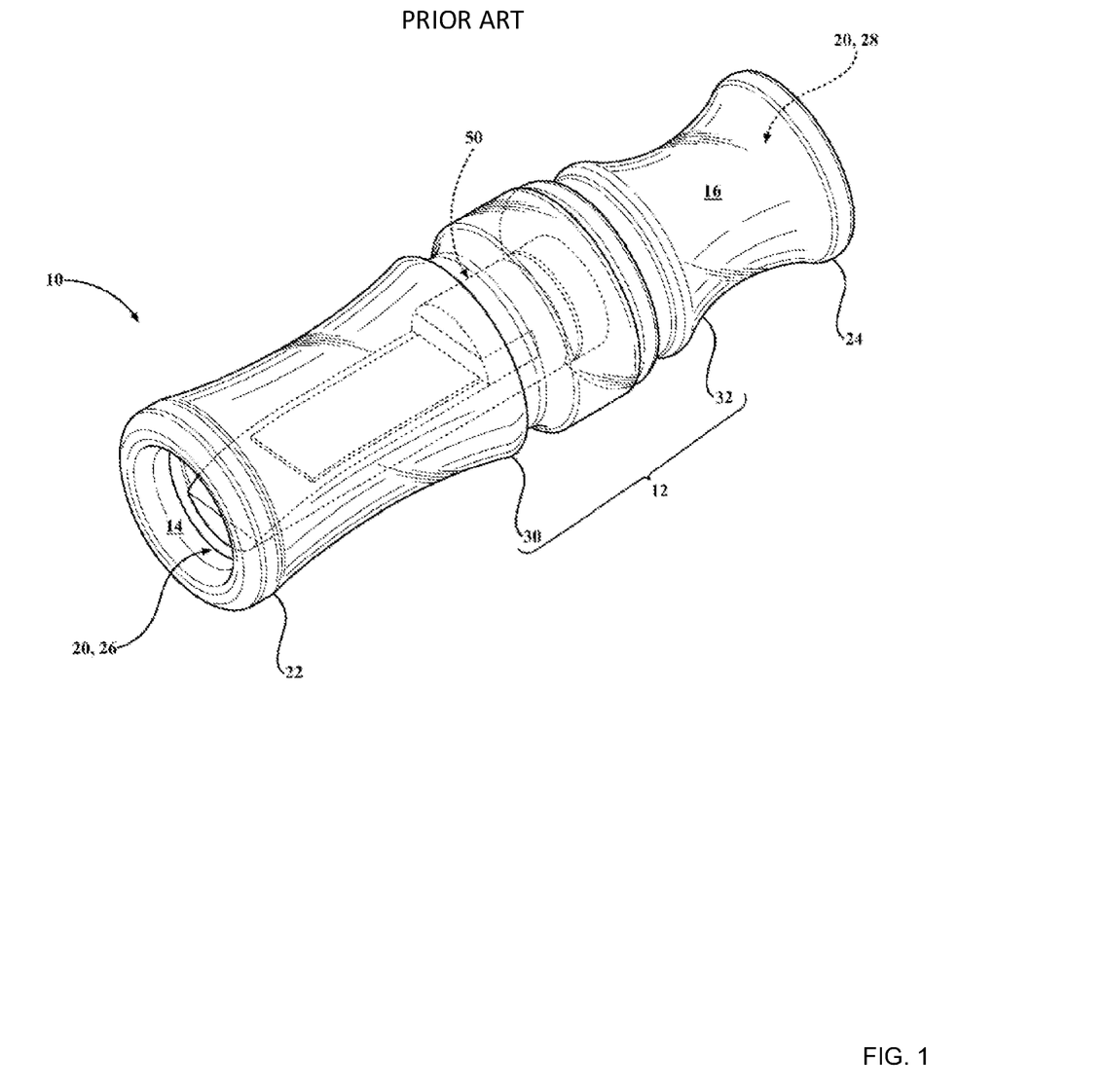
FIG. 1 shows a perspective view of an example game call, which may be improved using the disclosed processes.
Figure 2:
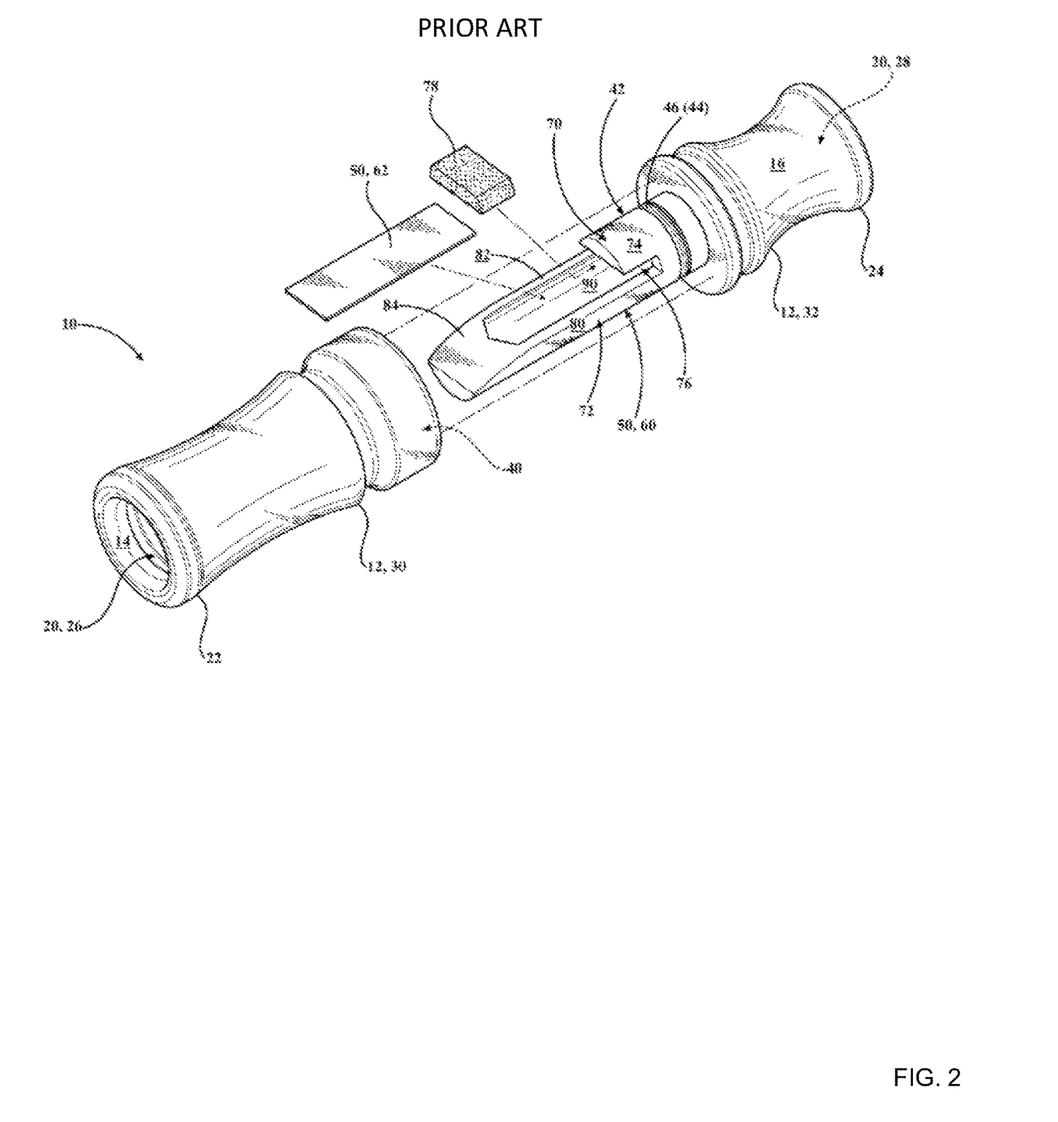
FIG. 2 shows an exploded perspective view of the game call shown in FIG. 1.

Air operated game calls are used in a variety of pursuits for simulating the sounds of game animals. When air is blown through the game call a sound imitative of a particular type of game is generated. FIGS. 1 and 2 show an example game call disclosed in U.S. Pat. No. 9,510,588 titled "GAME CALL" and filed Dec. 6, 2016, which is fully incorporated by reference herein. As described therein: the game call 10 includes an elongate tubular housing 12 that houses a reed system 50 (or guts 50). The tubular housing 12 is a rigid, tubular structure that may, as shown, have a generally cylindrical shape. The tubular housing 12 has an interior surface 14 and an outer surface 16. Optionally, the outer surface 16 may be contoured, as generally shown, or have other decorative features.

The interior surface 14 of the tubular housing 12 defines an open ended air channel 20 extending longitudinally through the tubular housing 12. The tubular housing 12 has a mouthpiece end 22 and an opposing exhaust end 24, with the air channel 20 opening to an air intake port 26 at the mouthpiece end 22, and opening to an exhaust port 28 at the opposing exhaust end 24.

The tubular housing 12 may have a one piece construction, or, as generally shown, may be implemented with a multiple piece construction. For instance, in the illustrated example of the tubular housing 12, the tubular housing 12 implements a two piece construction including a barrel 30 and an insert 32. In this example, the barrel 30 forms the mouthpiece end 22 of the tubular housing, and the insert 32 forms the exhaust end 24.

The barrel 30, opposite its mouthpiece end 22, and the insert 32, opposite its exhaust end 24, may respectively include complementary features for removably joining the barrel 30 and the insert 32 to complete the open ended air channel 20 of the tubular housing 12 through the barrel 30 and the insert 32. For instance, the barrel 30, opposite its mouthpiece end 22, may form a socket 40 sized for receiving a necked down portion 42 of the insert 32 formed opposite its exhaust end 24. As shown, the necked down portion 42 of the insert 32 may define one or more grooves 44 for accommodating a respective one or more sealing rings 46, with the sealing rings 46 sitting flush with or projecting slightly beyond the remainder of the necked down portion 42 in order to support the formation of a fluid tight seal between the socket 40 of the barrel 30 and the necked down portion 42 of the insert 32.

The reed system 50 and other aspects of the game call 10, such as the tubular housing 12, can be adapted to simulate the sounds of a variety of game animals, including without limitation waterfowl. The example game call 10, for instance, has a tubular housing 12 and includes a reed system 50 collaboratively adapted to generally simulate the sounds of ducks. The reed system 50 is positioned in the tubular housing 12, and is generally configured to support the production by the game call 10 of sounds that simulate those of game animals, such as ducks.

Figure 3:
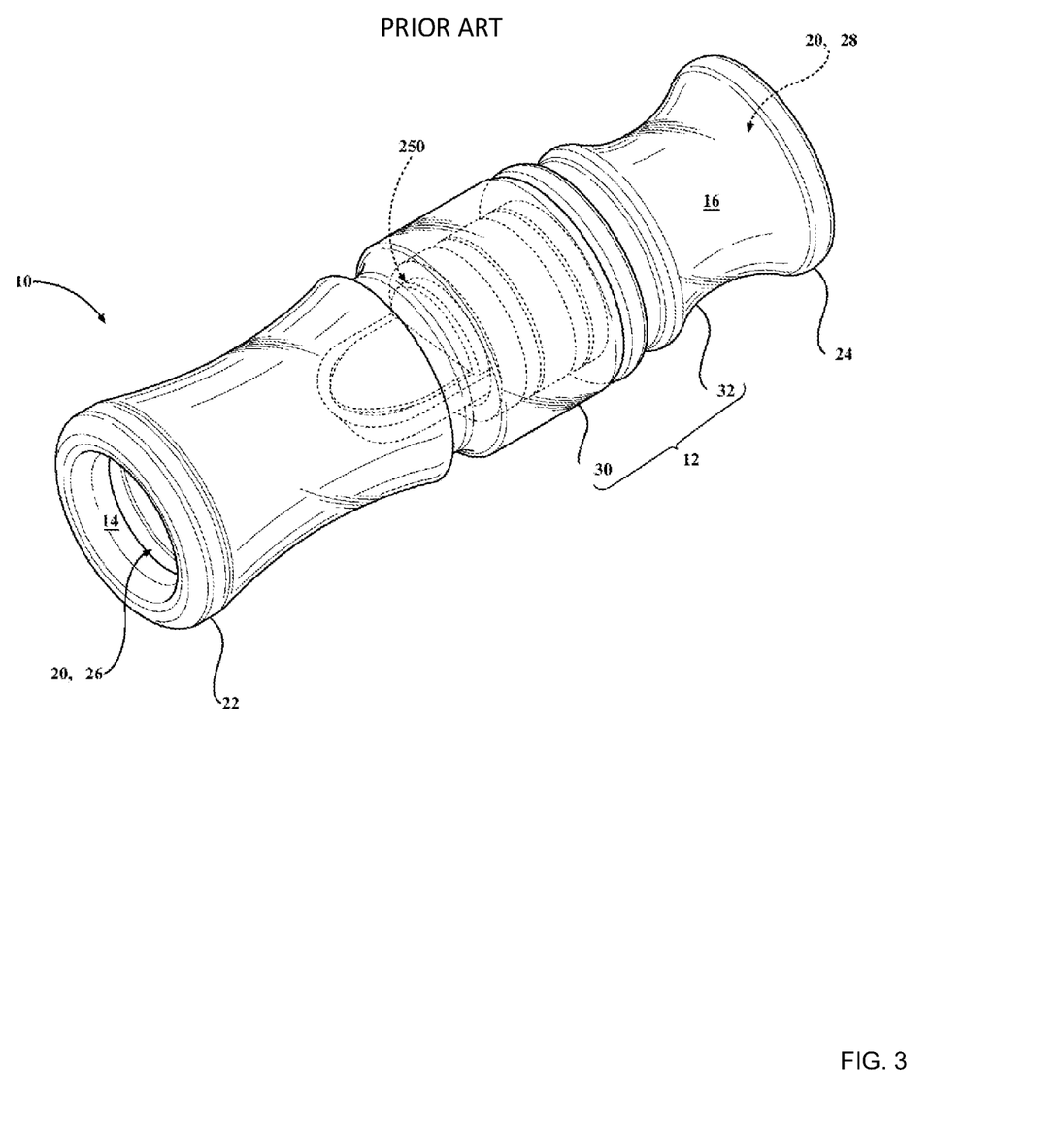
FIG. 3 shows a perspective view of another example game call, which may be improved using the disclosed processes.

As shown in FIGS. 2 and 3, the reed system 50 includes a tone board 60 and a reed 62. The tone board 60 is positioned in the air channel 20 defined by the interior surface 14 of the tubular housing 12, at a medial segment of the tubular housing 12 between the air intake port 26 at its mouthpiece end 22 and the exhaust port 28 at its opposing exhaust end 24.

The tone board 60 generally includes a wedge portion 70 and a tone board portion 72. The wedge portion 70 is generally shaped and sized for spanning the air channel 20, and defines a radially outer surface 74 that is shaped to mate with the interior surface 14 of the tubular housing 12 defining the air channel 20. As such, with the tone board 60 positioned in the air channel 20, the interior surface 14 of the tubular housing 12 generally circumscribes the radially outer surface 74 of the wedge portion 70 in mateable engagement. This results in a tight, substantially fluid tight fit between the wedge portion 70 and the interior surface 14 of the tubular housing 12.

The tone board portion 72 is generally shaped and sized for occupying a partial portion of the air channel 20. The tone board portion 72 includes a radially outer base 80 that is generally shaped to mate with a partial circumferential portion of the interior surface 14 of the tubular housing 12, and a tone board surface 82 that faces the remainder of the interior surface 14. With the tone board 60 positioned within the air channel 20, a partial circumferential portion of the interior surface 14 of the tubular housing 12 generally circumscribes the radially outer base 80 of the tone board portion 72 in mateable engagement, and the tone board surface 82 extends across the air channel 20 between opposed segments of the interior surface 14 of the tubular housing 12.

The reed 62 is positioned to extend over the tone board portion 72 and rest on the tone board surface 82. In the example game call 10, a downstream end of the reed 62 is held by the wedge portion 70 of the tone board 60, while the remainder of the reed 62 resting on the tone board surface 82 is generally free. In this example, the wedge portion 70 of the tone board 60 defines a transverse recess 76. The downstream end of the reed 62 is positioned within the recess 76, and to hold it, a retainer 78 is lodged into the remainder of the recess 76. The retainer 78 when lodged contiguously forms a portion of the radially outer surface 74 of the wedge portion 70 that is shaped to mate with the interior surface 14 of the tubular housing 12 defining the air channel 20.

To operate the game call 10, a caller blows air into the tubular housing 12 at its mouthpiece end 22. The resulting passage of air into the air channel 20 from the air intake port 26, and ultimately, through the sound channel 90 and out the exhaust port 28 at the opposing exhaust end 24 of the tubular housing 12, vibrates the reed 62 against the tone board surface 82, which generates sounds that drive the production by the game call 10 of sounds that simulate those of game animals.

Figure 4:
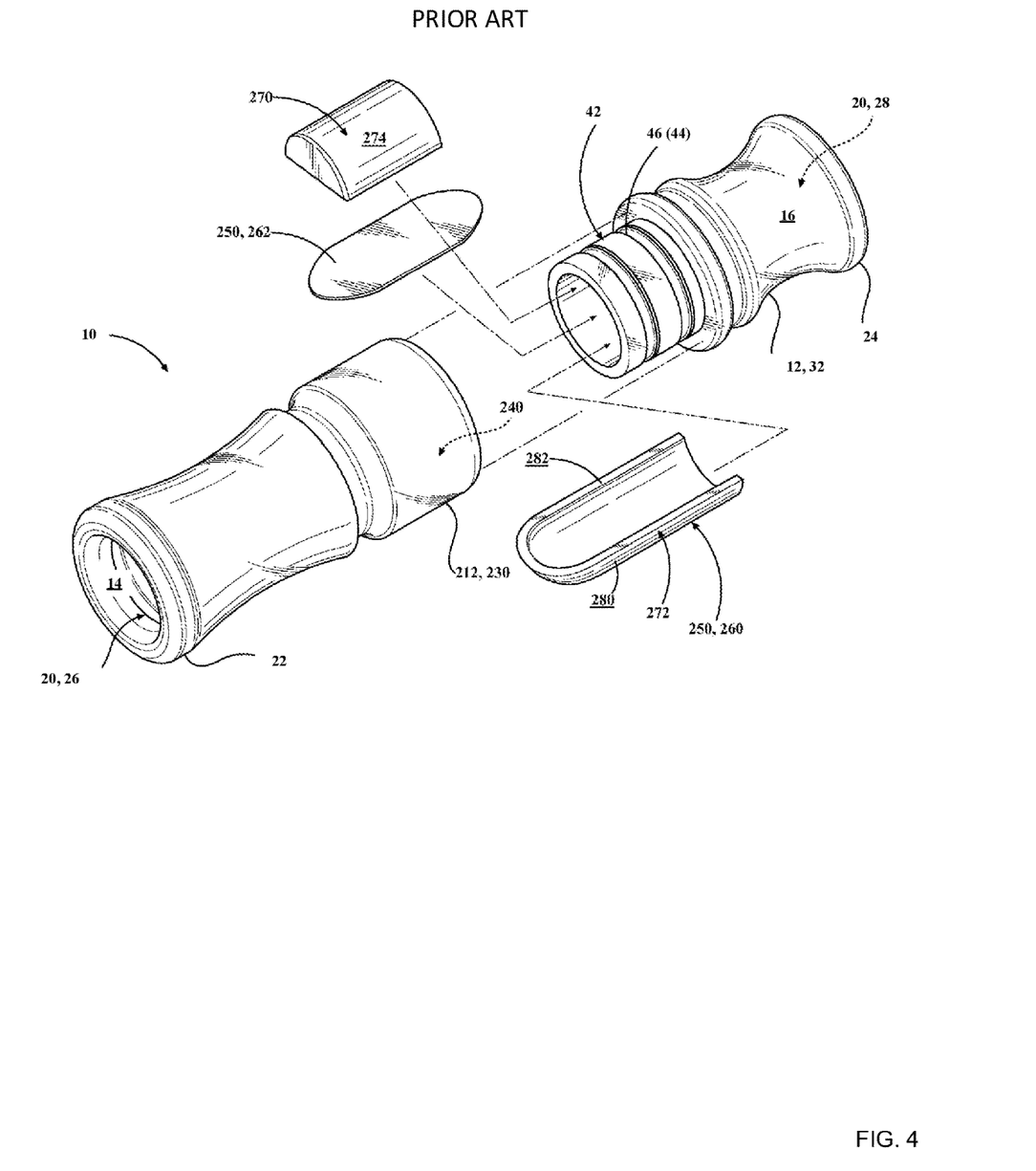
FIG. 4 shows an exploded perspective view of the game call shown in FIG. 3.

In the arrangement shown in FIGS. 1 and 2, tone board 60 and insert 32 are formed of a single unitary component. However, in some game calls tone board 60 may be a separate component, for example, that is inserted into a bore hole of insert 32. For example, FIGS. 2 and 4 show a game call having another example reed system 250 (or guts 250). In this example, the reed system 250 includes a tone board 260 and a reed 262. The tone board 260 is positioned in the air channel 20 defined by the interior surface 14 of the tubular housing 12, at a medial segment of the tubular housing 12 between the air intake port 26 at its mouthpiece end 22 and the exhaust port 28 at its opposing exhaust end 24.

The tone board 260 generally includes a wedge portion 270 and a tone board portion 272. The wedge portion 270 is generally shaped and sized for spanning the air channel 20, and defines a radially outer surface 274 that is shaped to mate with the interior surface 14 of the tubular housing 12 defining the air channel 20. As such, with the tone board 260 positioned in the air channel 20, the interior surface 14 of the tubular housing 12 generally circumscribes the radially outer surface 274 of the wedge portion 270 in mateable engagement. This results in a tight, substantially fluid tight fit between the wedge portion 270 and the interior surface 14 of the tubular housing 12.

The tone board portion 272 is generally shaped and sized for occupying a partial portion of the air channel 20. The tone board portion 272 includes a radially outer base 280 that is generally shaped to mate with a partial circumferential portion of the interior surface 14 of the tubular housing 12, and a tone board surface 282 that faces the remainder of the interior surface 14. With the tone board 260 positioned within the air channel 20, a partial circumferential portion of the interior surface 14 of the tubular housing 12 generally circumscribes the radially outer base 280 of the tone board portion 272 in mateable engagement, and the tone board surface 282 extends across the air channel 20 between opposed segments of the interior surface 14 of the tubular housing 12.

Game calls have generally been made from grass or tree products such as wood, pine cones, etc. Such game calls are not adequate to serve as a memorial keepsake in a memorial or funeral service for a deceased human or animal to preserve the remains and memories of the deceased for bereaved family, friends, loved ones, lovers, or acquaintances. Currently there is no practical way to incorporate ashes of cremated remains of from a deceased human or animal in a game call.

Therefore, for all the reasons stated above, and the reasons stated below, there is a need in the art for a game call that incorporates cremated remains of from a deceased human or animal. It is a primary object of the disclosure to provide a method for manufacturing a game call that permits cremated remains of from a deceased human or animal to be incorporated.

Another object of the disclosure is to provide a method for manufacturing a game call, which provides sentimental value.

Yet another object of the disclosure is to provide a method for manufacturing a game call, which serves as a remembrance of a deceased loved one.

Another object of the disclosure is to provide a cost efficient method for manufacturing a game call.

Yet another object of the disclosure is to provide a time efficient method for manufacturing a game call.

Another object of the disclosure is to provide a method for manufacturing a game call, which is robust.

Yet another object of the disclosure is to provide a method for manufacturing a game call, which is durable.

Another object of the disclosure is to provide a method for manufacturing a game call, which provides unique functionality.

Yet another object of the disclosure is to provide a method for manufacturing a game call, which is strong.

Another object of the disclosure is to provide a method for manufacturing a game call, which is aesthetically pleasing.

Yet another object of the disclosure is to provide a method for manufacturing a game call, which is easy and intuitive to use.

Another object of the disclosure is to provide a method for manufacturing a game call, which has a long useful life.

Yet another object of the disclosure is to provide a method for manufacturing a game call, which is high quality.

These and other objects, features, or advantages of the disclosure will become apparent from the specification, figures and claims.

SUMMARY OF THE DISCLOSURE

In one or more arrangements, a method for manufacturing a game call that incorporates ashes of cremated animal or human remains is provided. Cremated human or animal remains are provided and mixed with a polymer to form a polymer and remains mixture. The polymer and remains mixture are poured into a mold. The mold is shaped for formation of a first component of the game call. After the polymer and remains mixture has hardened, the polymer and remains mixture is removed from the mold and set to cure. After curing, a call profile is cut into the hardened mixture to form the first component. In one or more embodiments, the first component is processed, for example, by sanding, wet sanding, finishing, painting, and/or polishing. The first component is then assembled with other components of the game call to form the game call.

In one or more arrangements, wherein the first component is an insert of the game call and the other components of the game call include a barrel and a set of guts. In one or more other arrangements, the first component is a barrel of the game call and the other components of the game call include an insert and a set of guts.

In one or more arrangements, wherein the polymer is a 50:50 mix of a resin and a hardener. In one or more arrangements, the polymer is a clear polymer.

In one or more arrangements, the polymer and remains mixture in the mold are molded under pressure. In one or more arrangements, the polymer and remains mixture in the mold are molded under pressure for 2-3 hours. In one or more arrangements, after removing the hardened polymer and remains mixture from the mold it is set to cure for 12-24 hours.

DETAILED DESCRIPTION OF THE DISCLOSURE

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the processes discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable In one or more arrangements, a method for manufacturing a game call that incorporates ashes of cremated animal or human remains is provided. The method permits the formation of customize game calls 10 that incorporate ashes of a cremated pet or loved one, thereby permitting a user to continue bringing the pet or loved with them for on sporting activities. The user would be able to have practical use of the ashes of their pet or loved one for sporting purposes or other chosen activities. As stated above, no practical way to incorporate ashes from cremated remains into a game call. The disclosed arrangements allow a user to possess and use ashes of a cremated pet or loved one in practical/usable product such as casted within an acrylic game call. The manufactured game call contains the remains/ashes of the pet or loved one who passed away and provides a physical/visual memory for the user that does not affect the sound of the call. In one or more arrangements, a game call is produced that permits a user to view ashes of their deceased pet or loved one in the acrylic casted game call thereby providing a memorial keepsake.

Not Limited to Reed Based Game Calls:

As used herein, various disclosed embodiments may be primarily illustrated and described in the context of reed based game calls. However, the embodiments are not so limited. It is appreciated that the embodiments may be adapted for use manufacture of various other types of game calls having one or more components formed of a polymer. The disclosed embodiments are merely shown and described as being used in the context of reed based game calls and as one of countless examples.

Not Limited to Game Calls:

As used herein, various disclosed embodiments may be primarily illustrated and described in the context of game calls. However, the embodiments are not so limited. It is appreciated that the embodiments may be adapted for use manufacture of various other objects having one or more components in formed of a polymer. The disclosed embodiments are merely shown and described as being used in the context of game calls and as one of countless examples.

Figure 5:
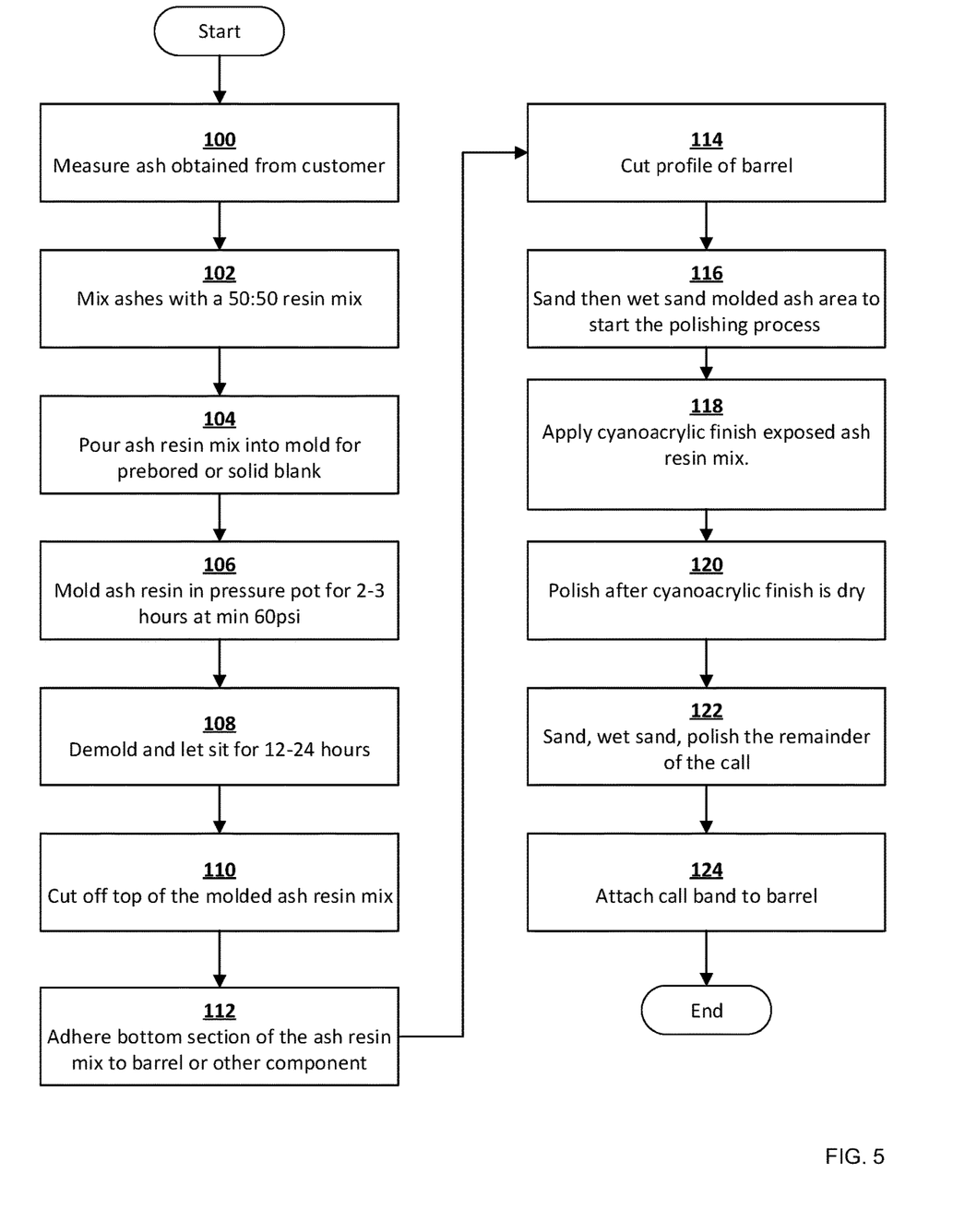
FIG. 5 shows a flowchart of an example process for manufacture of a game call, in accordance with one or more embodiments.
Figure 6:
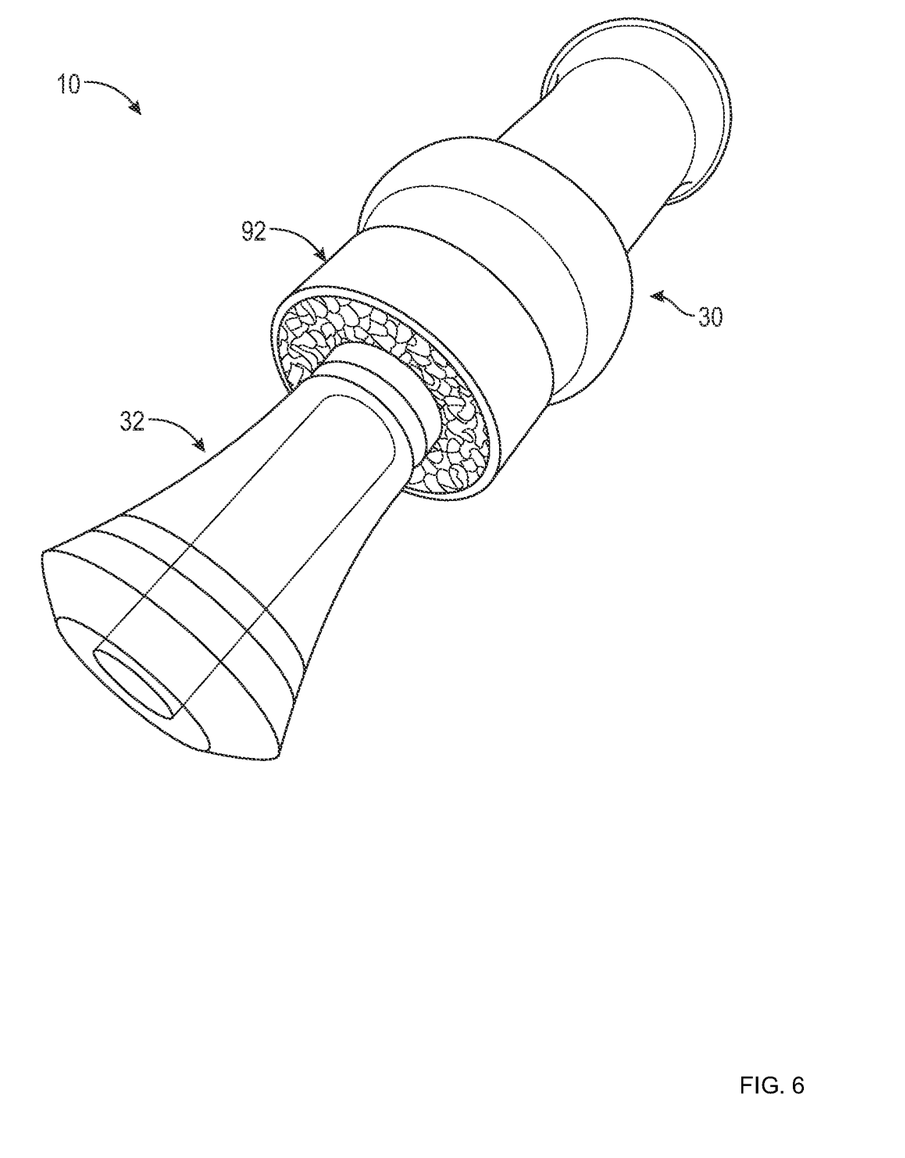
FIG. 6 shows a perspective view of an example game call manufactured in accordance with one or more embodiments.
Figure 7:
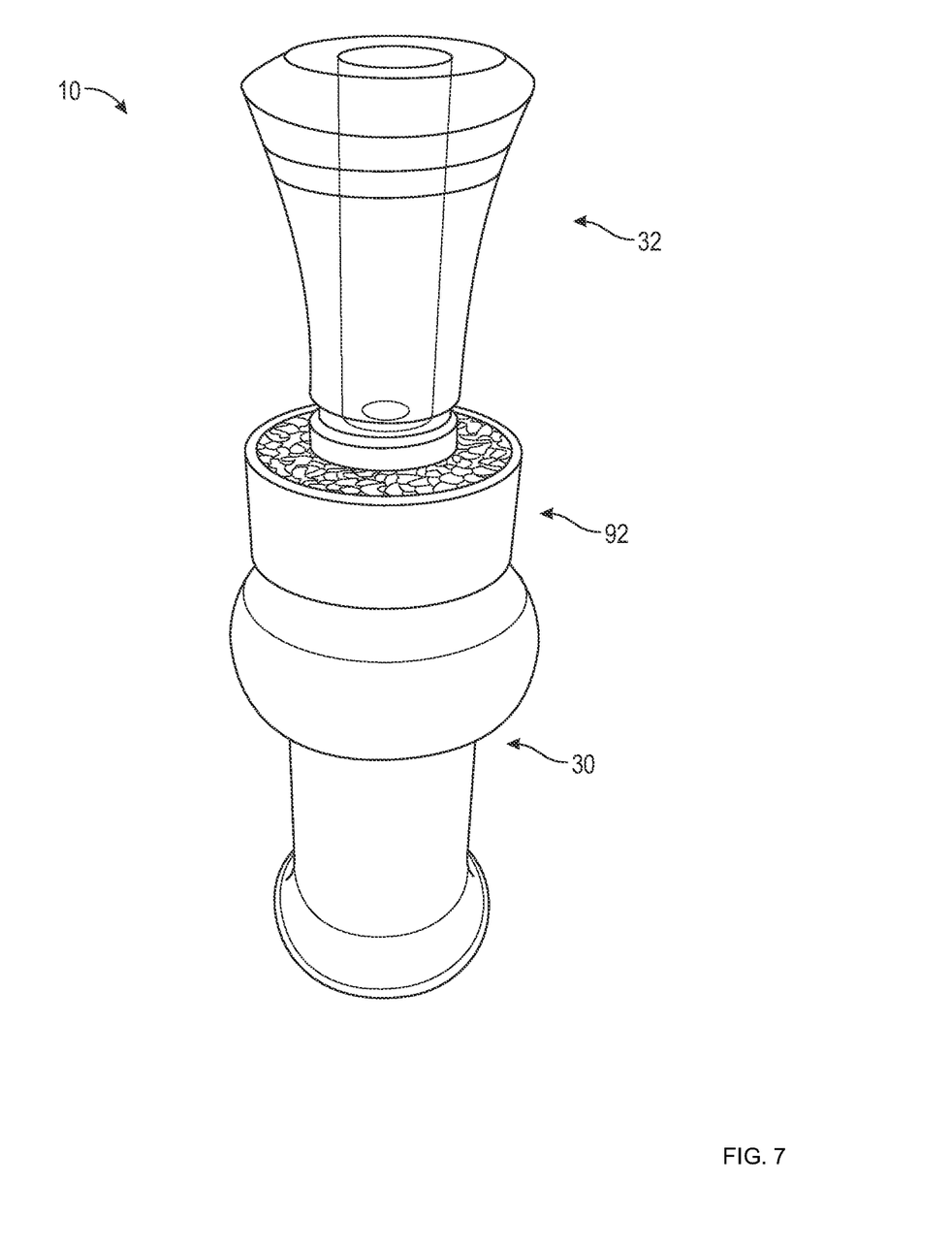
FIG. 7 shows a side view of an example game call manufactured in accordance with one or more embodiments.
Figure 8:
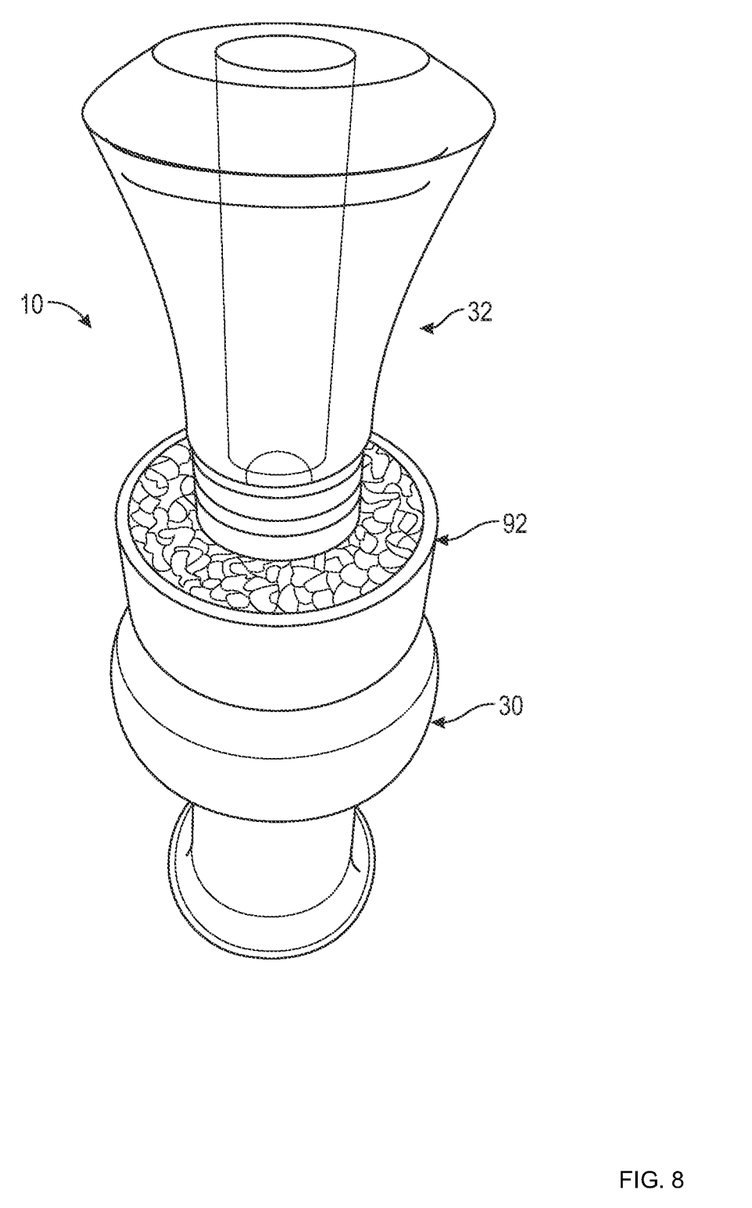
FIG. 8 shows a side view of an example game call manufactured in accordance with one or more embodiments.
Figure 9:
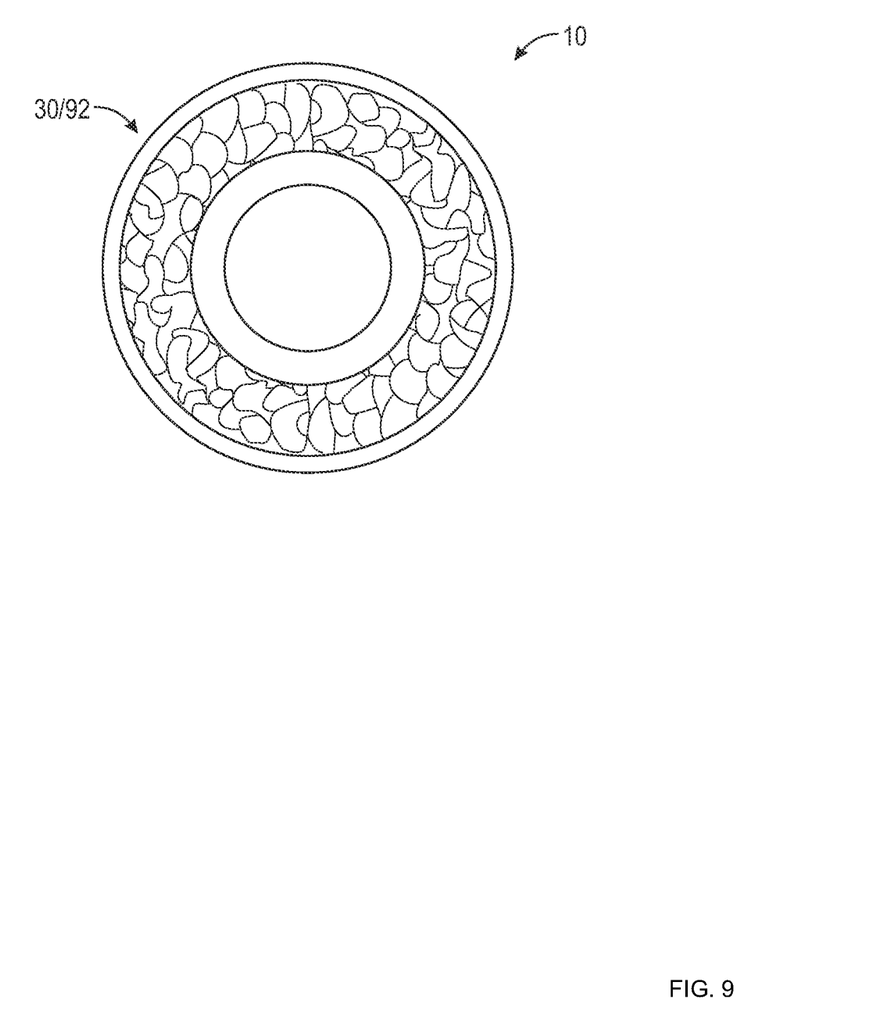
FIG. 9 shows an end view of example barrel of a game call, consistent with one or more embodiments.
Figure 10:
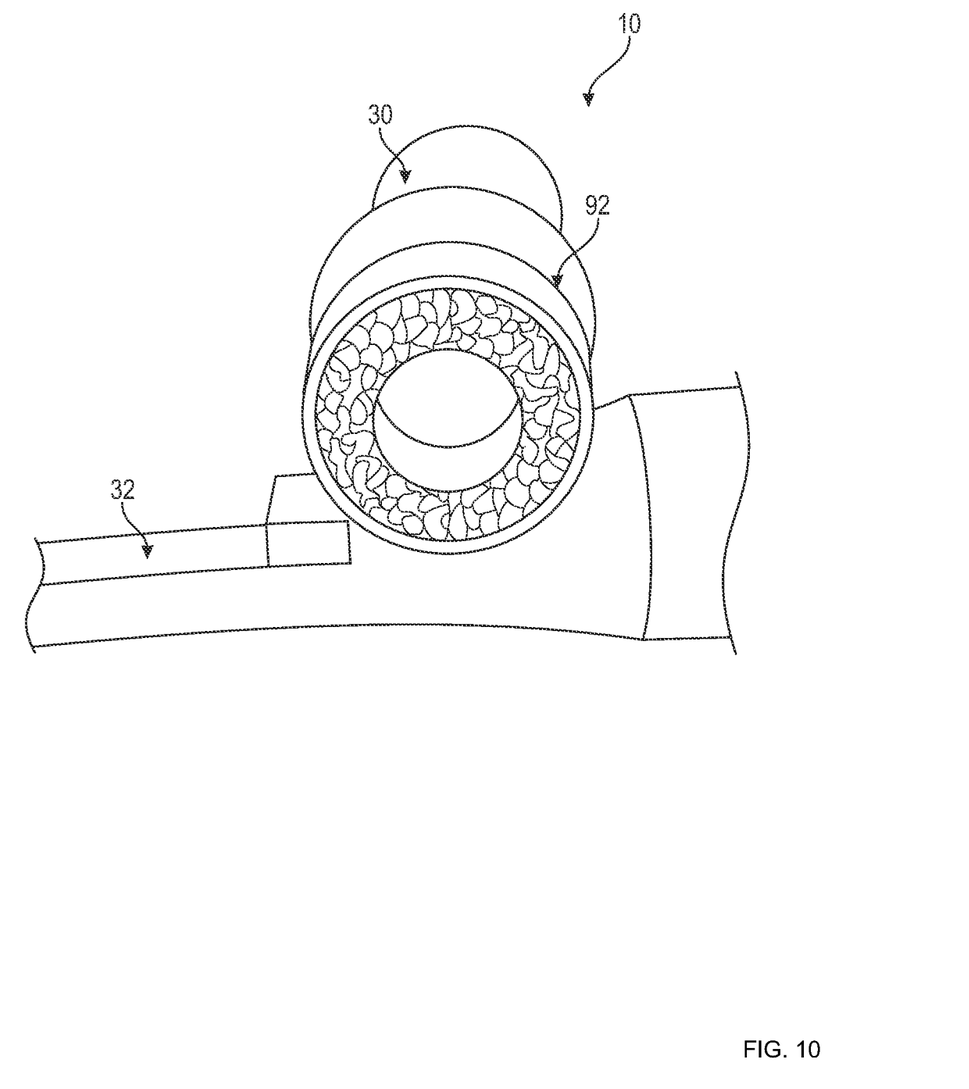
FIG. 10 shows an end view of example barrel of a game call and partial side view of an insert of a game call.

Process for Manufacture:

In one or more arrangements, a method for manufacturing a game call that incorporates ashes of cremated animal or human remains is provided. The method may comprise any suitable arrangement, flow, or sequence of operations and/or processes configure to cast one or more components of a game call using a polymer within which ashes of cremated animal or human remain are mixed at some point during the casting process. FIG. 5 shows a flowchart of one example method for manufacture of a call, in accordance with one or more arrangements. In this arrangement shown, as one example, ash of cremated animal or human remains is obtained from a customer and measured at block 100.

Casting and Formation of Blank:

At block 102, ashes are combined with a polymer (e.g. a 50:50 mix of resin and hardener to from an ash polymer mix. Various arrangements may use various polymers to form the ash polymer mix including but not limited to, for example, various natural and synthetic resins such as acrylic, epoxy, polyethylene, polyurethane, polyamide, polycarbonate, polypropylene, polystyrene, alkyd, and/or silicon resins.

At block 106, the ash polymer mix is molded for 2-3 hours under pressure. In one or more arrangement, as one example, the ash polymer mix is molded at a pressure of approximately 60 psi or more. In one or more arrangement, ash polymer mix may be molded 60 psi or more using, for example, a pressure pot.

At block 108, the molded ash polymer mix is demolded and left to sit for 12-24 hours.

At block 110, a top portion of the molded ash polymer mix is removed. The remaining bottom portion, which settled to the bottom of the mold while being molded, forming a blank. In one or more arrangements, the top portion may be removed for example, by cutting, grinding, sawing, sanding, or any other device, mechanism, or means for removal of a portion of hardened resin.

In the arrangement shown, as one example, the blank is attached to the end of the barrel 30 at block 112 (e.g., via cocasting or adhesive). Additionally or alternatively, the blank may be attached to the insert 32, or other component of the call. Additionally or alternatively, in one or more embodiments, one or more components of call 10 (e.g., barrel 30 and/or insert 32) may be formed entirely out of the ash polymer mix.

Cutting Call Profile

At block 114, a profile of the barrel 30 for the game call. The cutting of the call profile may be accomplished by hand cutting, lathe cutting orbital sanding, and/or any other cutting or shaping process. Generally, band area of the barrel 30 is cut larger than the width of a call band 92 (if included). The larger band area of barrel 30 increases visibility of the ash polymer mix portion attached to the barrel 30 block 112.

Finishing and Polishing:

At block 116, the exposed surface of the ash polymer mix and/or other portion of barrel 30 are sanded and then wet sanded to start the polishing process. The sanding may be accomplished by hand sanding, lathe sanding, orbital sanding, bench sanding or any other sanding process or any other process.

At block 118, finish is applied to exposed surface of the molded ash polymer mix and/or barrel 30. Various arrangements may use various finishes including but not limited to, for example, acrylic resins such as cyanoacrylic, polyurethane, danish oil, shellac, lacquer, waxes, and/or any other type of finish. Once the finish is dry, the molded ash polymer mix and/or barrel is polished at block 120.

Finishing and Polishing of Other Components:

At block 122, insert 32 and/or any remaining portion of the call is sanded, wet sanded, and polished. The sanding may be accomplished by hand sanding, lathe sanding, orbital sanding, bench sanding or any other sanding process or any other process.

Attachment of Call Band:

In one or more arrangements, a call band 92 and/or other decorative features are attached to the barrel at block 124. Call band 92 may be attached to the barrel using various different means and/or methods including but not limited to, for example, glues, adhesives, pins, screws, clips, snaps, and/or thermal expansion/contraction of call band 92. In one or more arrangements, the call band 92 may be engraved with a name of the deceased.

Assembly:

Finally, at block 126, barrel 30, insert 32, and guts of game call are assembled. Typically for most types game calls, guts 50/250 are positioned an attached to insert 32. After attaching guts 50/250. The insert 32 is inserted into a socket 40 end of barrel 30 to complete assembly of a game call 10.

That is cost efficient; that is time efficient; which is robust; which is durable; which provides unique functionality; which is strong; which is aesthetically pleasing; which is easy and intuitive to use; which has a long useful life; which is high quality. These and other objects, features, or advantages of the disclosure will become apparent from the specification, figures and claims.

It will be appreciated by those skilled in the art that other various modifications could be made to the device without parting from the spirit and scope of this disclosure. All such modifications and changes fall within the scope of the claims and are intended to be covered thereby.

What is claimed is:

1. A method of making a game call comprising:
providing cremated human or animal remains;
mixing the cremated human or animal remains with a polymer to form a polymer and remains mixture;
pouring the polymer and remains mixture into a mold;
wherein the mold is shaped for formation of a first component of the game call;
after the polymer and remains mixture has hardened, removing the polymer and remains mixture from the mold;
providing a barrel and a band;
attaching the first component to an end of the barrel;
cutting the barrel and first component to an appropriate size;
placing the band over the first component and the end of the barrel;
connecting an insert into the end of the barrel; and
wherein the polymer and remains mixture is visible between the band and the insert.

2. The method of claim 1, wherein the first component forms at least a portion of the insert of the game.

3. The method of claim 1, further comprising attaching the first component to the barrel of the game call.

4. The method of claim 1, wherein the polymer is a 50:50 mix of a resin and a hardener.

5. The method of claim 1, wherein the polymer is a clear polymer.

6. The method of claim 1, further comprising molding the polymer and remains mixture in the mold under pressure.

7. The method of claim 1, further comprising molding the polymer and remains mixture in the mold under pressure for 2-3 hours.

8. The method of claim 1, further comprising molding the polymer and remains mixture in the mold under 60 PSI of pressure or more.

9. The method of claim 1, further comprising boring a hole through the hardened polymer and remains mixture.

10. The method of claim 1, further comprising cutting a call profile into the hardened polymer and remains mixture.

11. The method of claim 1, further comprising sanding the hardened polymer and remains mixture.

12. The method of claim 1, further comprising letting the hardened polymer and remains mixture sit for 12-24 hours after removing the hardened polymer and remains mixture from the mold; and
after letting the hardened polymer and remains mixture sit for the 12-24 hours, sanding the hardened polymer and remains mixture.

13. The method of claim 1, further comprising sanding the hardened polymer and remains mixture; and
applying a finish to the hardened polymer and remains mixture after sanding.

14. The method of claim 1, further comprising sanding the hardened polymer and remains mixture;
applying a finish to the hardened polymer and remains mixture after sanding;
after the finish is dry polishing the finish.

15. The method of claim 1, further comprising sanding the hardened polymer and remains mixture;
applying a cyanoacrylic finish to the hardened polymer and remains mixture after sanding;
after the finish is dry polishing the finish.

16. A game call, formed by the steps comprising:
providing cremated human or animal remains;
mixing the cremated human or animal remains with a polymer to form a polymer and remains mixture;
pouring the polymer and remains mixture into a mold;
wherein the mold is shaped for formation of a first component of the game call;
after the polymer and remains mixture has hardened, removing the polymer and remains mixture from the mold;
providing a barrel and a band;
attaching the first component to an end of the barrel;
cutting the barrel and first component to an appropriate size;
placing the band over the first component and the end of the barrel;
connecting an insert into the end of the barrel; and
where the polymer and remains mixture is visible between the band and the insert.

17. The product of claim 16, wherein the first component forms at least a portion of the barrel of the game call.

18. The product of claim 16, wherein the polymer is a 50:50 mix of a resin and a hardener.

19. A method of making a game call comprising:
providing cremated human or animal remains;
mixing the cremated human or animal remains with a polymer to form a polymer and remains mixture;
pouring the polymer and remains mixture into a mold;
wherein the mold is shaped for formation of a first component of the game call;
after the polymer and remains mixture has hardened, removing the polymer and remains mixture from the mold;
providing a barrel and a band;
attaching the first component to an end of the barrel;
cutting the barrel and first component to an appropriate size;
placing the band over the first component and the end of the barrel;
connecting an insert into the end of the barrel; and
wherein the polymer and remains mixture is visible at the end of the barrel.

* * * * *